United States Patent [19]

Winkelbauer et al.

[11] Patent Number: 4,810,415
[45] Date of Patent: Mar. 7, 1989

[54] PROCESS FOR MANUFACTURING ULTRA PURE SILICA AND RESULTING ENCAPSULATED PRODUCTS

[75] Inventors: Howard M. Winkelbauer, McKeesport, Pa.; Glenn A. Moore, Junction City, Oreg.

[73] Assignee: Dresser Industries, Inc., Dallas, Tex.

[21] Appl. No.: 905,803

[22] Filed: Sep. 10, 1986

Related U.S. Application Data

[63] Continuation-in-part of Ser. No. 779,549, Sep. 24, 1985, abandoned.

[51] Int. Cl.$^4$ .................. C01B 33/12; C01B 33/18; C09K 3/00
[52] U.S. Cl. ...................... 252/183.13; 252/315.6; 423/335; 423/338; 423/339; 106/287.34
[58] Field of Search ............ 252/188.31, 315.6; 423/335, 338, 339

[56] References Cited

U.S. PATENT DOCUMENTS

| | | | |
|---|---|---|---|
| 3,672,833 | 2/1971 | Teichner et al. | 423/338 |
| 4,006,175 | 2/1977 | Termin et al. | 423/339 X |
| 4,053,565 | 10/1977 | Krekeler et al. | 423/338 |
| 4,070,286 | 1/1978 | Iler et al. | 210/656 |
| 4,228,261 | 10/1980 | Scholten | 502/330 |
| 4,243,422 | 1/1981 | Lenz et al. | 106/52 |
| 4,249,903 | 2/1981 | Smolka et al. | 252/174.25 X |
| 4,327,065 | 4/1982 | von Dardel et al. | 423/338 |
| 4,619,908 | 10/1986 | Cheng et al. | 423/338 X |

Primary Examiner—John F. Terapane
Assistant Examiner—Virginia B. Caress
Attorney, Agent, or Firm—Sigalos, Levine & Montgomery

[57] ABSTRACT

High purity silica powder formed from a sol-gel process is made from a quantity of an industrial grade hydrolizable silicon organometallic substance mixed with a quantity of an industrial grade organic solvent miscible in said organometallic substance and with a quantity of an acidified water having a pH less than 2 to form a solution. The solution is heated, then dried to form a gel, milled, and calcined to form the pure silica powder and the pure powder used to form encapsulated microminiature circuits.

4 Claims, 1 Drawing Sheet

PROCESS FOR MANUFACTURING ULTRA PURE SILICA AND RESULTING ENCAPSULATED PRODUCTS

REFERENCE TO RELATED APPLICATION

The instant application is a continuation-in-part of U.S. Application Ser. No. 779,549 filed Sept. 24, 1985 abandoned.

BACKGROUND OF THE INVENTION

This invention relates to a process for manufacturing pure silica, and in particular, to such a process utilizing primarily industrial grade raw materials.

The need for purer silica powder is gaining importance in the electronics industry as 256 K DRAM and megabit chips are becoming mass produced. It is important that these chips be encapsulated to protect them from problems such as moisture. The term "encapsulated" as used here refers to a package which consists of micro-miniature circuit embedded in an encapsulating material. Generally the encapsulation includes resin blocks, silica and urethanes, for example. When the chips become very dense as in the case of fabricating very large scale integrated circuits (VLSI), the purity of silicon powder used to form the encapsulating material becomes extremely important. Pure silica is needed to encapsulate these chips which protects them from the environment. The relative purity of the powder is extremely important as impurities can change the electrical characteristics of the silica and create conduction paths. For example, carbon, iron, as well as other metallics within the silica powder can create conduction paths which produce short circuits within the electronic components being encapsulated. Thus, it is essential in producing silica products for use within the electronic industry, that the quantity of carbon and iron within the silica powder be maintained at a minimum. Conventional electronic grade silica used for encapsulation usually contains from about 200 to 300 ppm carbon. Furthermore, uranium and thorium, which produce alpha radiation, must be kept at a minimum as this radiation from isotopes of these elements is capable of damaging the memory functons causing so-called soft errors.

Not only must the purity of the silica powder be controlled, but also the size of the particles of the powder must be controlled. If the powder is too fine, i.e., mostly −20 microns, then excessive quantities or resin must be used in forming the encapsulating material.

It has heretofore been known that such pure silica powder can be formed by a sol-gel processby gelling, drying, milling and calcining a batch made from equal volumes of distilled tetraethylorthosilicate (hereinafter (TEOS), reagent-grade ethanol, and acidified distilled water.

The raw materials have to be subject to multiple distillations to purify the same and ultra-clean rooms required to carry out the sol-gel process.

Although relatively pure silica powder is obtained when using the above constituents, the relatively high cost of the raw materials used in the process, the relatively high level of carbon found within the silica powder, and the lack of any substantial quantity of +325 mesh particles, results in a relatively expensive and not totally commercially satisfactory product.

SUMMARY OF THE INVENTION

Accordingly, it is an object of this invention to produce a pure silica powder from relatively inexpensive raw stock material, which powder has substantially low levels of carbon, iron, uranium and thorium, and the necessary coarse particle size distribution to provide a commercially satisfactory powder.

It is also an object of the present invention to produce micro-miniature circuits encapsulated with such ulta pure silica powder.

DESCRIPTION OF THE PREFERRED EMBODIMENT

In the following examples, TEOS has been utilized as the organic source of silica. However, other hydrolizable silicon organometallic sources, such as methyl silicate, or TMOS (tetramethylorthosilicate, also called tetramethoxysilane or methyltrimethoxysilane), can also be used. TEOS is preferably used since it reacts more slowly with water than TMOS, comes to equilibrium as a complex silanol, and in a partially hydrolyzed state is more stable over longer periods of time than the other silicon alkoxides.

Further, within the following examples, the alcohol solvent is illustrated as ethanol. However, it should be understood any alcohol such as methanol, propanol, isopropanol, and butanol also might be used. In addition, other organic solvents which are miscible in both TEOS and water may be suitably substituted for the ethanol. The foregoing would include ketones and amides like acetone, dioxane and dimethylformamide.

Similarly, although hydrochloric acid is illustrated in the examples, other acids may be used to catalyze the reaction between TEOS and water. Hydrochloric acid is preferably used because it may be easily removed from the silica powder by simple heating.

Figure 2:
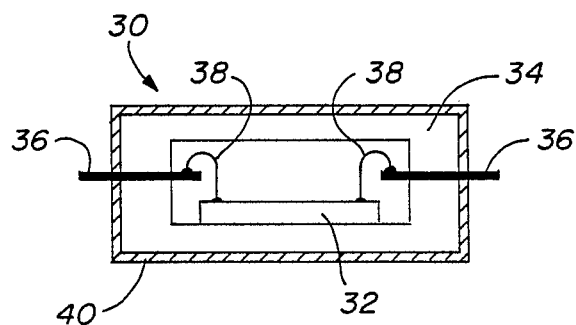
FIG. 2 is a diagrammatic representation of an integrated chip of the present invention.

Referring to FIG. 2, there is shown a microminiature circuit; namely, an integrated circuit chip 30, wherein integrated circuit 32 is housed in package base 34 and coupled to external leads 36 through internal conductor 38. The entire unit, with the exception of the outer portions of external leads 36 is encapsulated with the pure silica of the present invention 40. The particular circuit 32, base 34, leads 36, and conductor 38 can be any conventionally used in integrated circuit chips.

The chip 30 is prepared in any commercially known manner and then encapsulated by any of the known techniques utilized with silicas used heretofore. In addition to integrated circuit chips, the pure silica of the present invention can be used for encapsulation of any other type of micro-miniature circuit which is conventionally encapsulated with silica.

Set forth below in Table I are typical analyses of electronic grade silica conventionally used as encapsulants and the pure silica of the present invention.

TABLE I

| | Conventional Silica | Silica of Present Invention |
|---|---|---|
| Chemical Analysis, ppm | | |

TABLE I-continued

|  | Conventional Silica | Silica of Present Invention |
|---|---|---|
| Iron | 145 | 1 |
| Sodium | 15 | 3 |
| Potassium | 45 | 2 |
| Calcium | 25 | not detected |
| Magnesium | 20 | 1 |
| Aluminum | 400 | not detected |
| Carbon | 200–300 | 20–40 |
| Radioactive Entities, ppb |  |  |
| Uranium | 185 | <0.36 |
| Thorium | 364 | <0.29 |

The invention will be further described in connection with the following examples which are set forth in purposes of illustration only.

EXAMPLE 1

TEOS is distilled at 173° C. using a liquid cold evaporation tube to collect the silicate. Equal volumes of reagent-grade ethanol, distilled TEOS and 0.1M HCl solution made from distilled water, are mixed until a clear liquid forms approximately 5 min. It was found that the sol-gel solution should be kept acidic. High pH solutions (previous testing) produced significantly less silica gel than low pH solutions. The solution pH is preferably maintained below 2.0. It was also determined that the quantity of acidified water used in the process should be between 520–720% of the stoichiometric amount. The solution is put in a drier for 24 hours at 73° C. During this time, gelation occurs. Drying is continued at 110° C. for an additional 24 hours. The dry gel is then milled for 48 hours in a plastic jar with solid plastic balls. The resultant powder is screened to −150 mesh using a polyester screen. The powder is then calcined in silica saggers to 1000° C. for 3 hours. The heat up rate used is 17° C./hr.

Although the silica powder produced in Example 1 was satisfactory by most standards of purity, it had excessive levels of carbon and was too fine. In addition, since the process required the use of distilled and reagent grade raw materials, the process would be too costly to use on a commercial basis to produce silica powder. It was thus necessary to modify both the process and the raw materials to obviate the aforedescribed deficiencies.

In an initial attempt to reduce the raw stock cost, industrial grade TEOS was substituted for the distilled TEOS. The tested brands of TEOS were: Dynasil A purchased from the Kay Fries Co.; Pure Silbond and Condensed Silbond purchased from the Stauffer Chemical Co.; and Condensed Ethyl Silicate purchased from the Union Carbide Co. Each of the sources of TEOS was mixed with the reagent grade alcohol and 0.1M HCl solution. The gel process described above was used to produce silica powder. A chemical analysis of the silica powder resulted in a conclusion that either industrial grain Dynasil A or Union Carbide's Condensed Ethyl Silicate could be used in lieu of distilled TEOS.

A similar analysis was done to determine if industrial grade ethanol could be substituted for the reagent grade ethanol. No. 3 solvent obtained from the U.S. Industrial Chemicals Co. was used with 0.1M HCl solution, and both distilled and industrial grade Dynasil A and Union Carbide's Condensed Ethyl Silicate. A chemical analysis of silica powder produced from the above mixes using the sol-gel process revealed that industrial grade alcohol could be used with industrial grade Dynasil A TEOS, without producing unsatisfactory levels of impurities.

A similar analysis was done to determine if acidified water made with tap water could be substituted for acidified water made with distilled water. Both distilled and industrial grade TEOS and industrial grade and reagent grade alcohol were used in manufacturing silica powder using the acidified water made with distilled water, and acidified water made with tap water. An analysis of the silica powder thus produced resulted in a conclusion that distilled water must be used.

Modifications in the process were attempted to eliminate the two remaining problems, i.e., the relatively high level of carbon within the calcined silica powder and the extremely fine particle size of the powder. As described previously, the sol-gel process involves mixing the raw materials until a clear liquid is formed. The solution is then placed in a drier for 24 hours at 73° C. until gelation occurs. Drying is continued at an elevated temperature, for example 110° C. for an additional 24 hours. The dried gel is then milled and screened. The screened powder is then calcined.

In an attempt to coarsen the particle size distribution within the silica powder, the drying time of the gel was increased. As Table I below indicates, a slow drying schedule resulted in a coarser particle size distribution. The gel which had been slowly dried, milled and then screened to −48 mesh before calcination, had, after firing, a particle size distribution with a greater percentage of +325 mesh particles.

TABLE I

Drying Study of Sol-Gel Silica

| Drying Schedule: | Slow | Normal |
|---|---|---|
|  | 24 hrs at 73° C. | 24 hrs at 73° C. |
|  | 2 hrs at 73° C. after transfer of gel to tray 73° C. to 110° C. at 8° C./hr. 24 hrs hold at 110° C. | 24 hrs at 110° C. |
|  | 1000 Gm Charge Milled 48 hrs | |
| Screen Analysis after Milling |  |  |
| +20 mesh | 5.0% | 6.7% |
| −48 mesh | 6.1 | 9.2 |
| Screened to | −48 mesh | −48 mesh |
|  | Calcined at 1093° C./2 hr. hold | |
|  | Heat up rate R.T. - 1093° C. at 17° C./hr. | |
| Alpine Screen Analysis |  |  |
| % +150 mesh | 7.31 | 1.03 |
| % +200 mesh | 17.15 | 5.13 |
| % +325 mesh | 34.75 | 17.57 |
| X-Ray Sedigraph Percent Particles Finer than: |  |  |
| 75 Microns | 97 | 99 |
| 53 | 90 | 94 |
| 38 | 76 | 85 |
| 27 | 58 | 75 |
| 19 | 48 | 67 |
| 13 | 39 | 59 |
| 9.4 | 33 | 51 |
| 6.6 | 26 | 45 |
| 4.7 | 21 | 38 |

To further increase the quantity of +325 mesh particles, the milling time of the dried gel was decreased. As one would expect, the decreased milling time gave a significantly greater amount of +325 mesh before calcination. However, calcination essentially fragmented all of the +325 fraction to a fine powder. T,0100

Calcination of the dried and milled gel was then conducted in several different types of kilns. The data shown below in Table III indicates that air flow through the powder bed during calcination is beneficial for lowering the carbon content of the silica powder. The air should be directed upward through the powder and it is believed the intimate contact between the carbon impurities and the air results in reduction of the remaining carbon impurities as substantially all the carbon is combusted. Merely increasing ventilation by calcining within a box with the cover removed proved insufficient.

TABLE II

Milling Study

| Milling Time: | 12 Hrs | 24 Hrs | Prior Data 48 Hrs. Normal Milling Time |
|---|---|---|---|

TABLE II-continued

Milling Study

| 1000 Gm Charge Screen Analysis After Milling | | | |
|---|---|---|---|
| +20 mesh | 23.5% | 18.5% | 6.7% |
| +200 mesh | 49.3 | 23.6 | 63.7 |
| Alpine Screen Analysis of −200 mesh Fraction | | | |
| +200 mesh | 0.04% | 0.004% | 0.05 |
| +325 mesh | 10.82 | 10.72 | 5.01 |

| | Calcination | | | | | |
|---|---|---|---|---|---|---|
| Temp: | 1038° C. | 1093° C. | 1039° C. | 1039° C. | 1000° C. | 1093° C. |
| Hold: | 3 hr. | 3 hr. | 2 hr. | 3 hr. | 3 hr. | 3 hr. |
| Alpine Screen Analysis | | | | | | |
| +200 mesh | 0.04% | 0.15% | 0.01% | 0.05% | 0.65% | 0.28% |
| +325 mesh | 2.98 | 0.99 | 1.54 | 0.76 | 2.68 | 6.42 |

TABLE III

Study to Lower Carbon Content

| Mix: | Equal volumes of Dynasil A, U.S.I.C.'s No. 3 Solvent, and 0.1 M HCl Solution. Batch gelled, dried, milled and screened to −150 mesh. | | | | |
|---|---|---|---|---|---|
| Kiln Conditions: | Gas-Fired Kiln | Electric Kiln Type I Open Ventilation | Electric Kiln Type II Controlled Ventilation | Electric Kiln Type II Sol-gel Silica made from UC's TEOS & USIC's No. 3 Solvent Calcined at 1094° C./3 hrs. | Electric Kiln Type II After 1000° C. hold, ramped up 17° C./hr. to 1094° C. with a 3 hr. hold. |
| Firing Schedule: | R.T. to 260° C., 6 hr hold at 260° C., 260–1000° C. at 17° C./hr., 3 hr. hold at 1000° C. | | | | |
| Total Carbon | | | | | |
| First Analysis, ppm | 123 | 99 | 113 | 187 | — |
| Second Analysis, ppm | — | — | 251 | — | — |
| Third Analysis, ppm | — | — | — | 110 | — |
| Fourth Analysis, Wt. % | — | — | 0.18 | — | 0.01 |
| Sulfur Analysis, ppm | — | — | 4 | — | — |
| LOI, % | — | — | 0.08 | — | 0.04 |
| Operation: | Normal Drying Special Calcining | Special Drying Normal Calcining | | Normal Drying Normal Calcining | |
| Drying Schedule: | 73° C., 24 hrs 110° C., 24 hrs | 24 hrs @ 73° C. transfer to trays, hold 2 hrs 73° C., then 8° C./hr to 110° C., 24 hrs @ 110° C. | | 73° C., 24 hrs 110° C., 24 hrs | |
| Calcination Schedule: | RT to 177° C. @ 17° C./hr, 3 hr hold at 117° C. 177 to 312° C. @ 17° C./hr, 3 hr hold at 312° C., 312 to 1000° C. @ 17° C./hr, 3 hr hold at 1000° C. | RT to 312° C./20 min, 5 hr hold at 312° C., 312° C. to 1000° C. @ 17° C./hr, 3 hr hold at 1000° C. | | | |

| | | | Air Flow into Kiln | | |
|---|---|---|---|---|---|
| | | | 10 SCFH | 20 SCFH | 30 SCFH |
| Total Carbon, ppm* | | | | | |
| First Analysis | 102 | 101 | 83 | 86 | 79 |
| Second Analysis | 262 | 131 | 118 | — | 169 |
| Sulfur, ppm | 2 | 3 | 4 | — | 2 |

*Each analysis was done by a different laboratory.

| Mix: | Equal Volume of Distilled Dynasil A, Reagent-grade Alcohol, and 0.1 M HCl Solution | | | | | |
|---|---|---|---|---|---|---|
| Calcination Temp: | 1149° C./2 hr hold | | 1149° C./4 hr hold | | 1149° C./8 hr hold | |
| | With Cover | W/O Cover | With Cover | W/O Cover | With Cover | W/O Cover |
| Total | | | | | | |

TABLE III-continued

Study to Lower Carbon Content

| Carbon, ppm | | | | | | |
|---|---|---|---|---|---|---|
| First Analysis | 130 | 168 | 108 | 132 | 148 | 153 |
| Second Analysis | 369 | 1,985 | 918 | 1,430 | 1,045 | 627 |
| (Range) | 366–372 | 1,980–1,990 | 911–924 | 1,430–1,430 | 1,030–1,060 | 608–645 |
| Third Analysis | — | 420* | — | — | — | — |

*Total carbon was 420 ppm. Total organic carbon was 350 ppm.

Further tests were conducted in an attempt to reduce the cost of producing the silica powder from the described sol-gel process. The test results are illustrated in Table IV below. The first tests indicated that less solvent could be used in the batch formulation. Although mixes C and D illustrated that suitable silica powder could be formed without a solvent, certain level of solvent is desired to cause the TEOS to react with the acidified water on a commercial basis. It was concluded that an ethanol-TEOS ratio by volume of 0.1 to 1:1 could be satisfactorily used.

Table V illustrates various changes made in the process to increase the quantity of coarse particles within the powder. It should be noted that samples O and P had the coarsest distributions as a result of fumed silica additions, 16 wt% and 10 wt% respectively. A coarser end product also resulted when samples were dried longer than usual, samples K and L; but the samples were not as coarse as O and P. Samples I and J were fired at 1221° C., 110° C. above normal. These samples showed a decreae in coarseness, possibly due to the higher thermal treatment.

TABLE IV

| Mix: | A | B | C | D | E | F | G |
|---|---|---|---|---|---|---|---|
| TEOS | | DYNASIL A | | | | | Union Carbide Ethyl Silicate |
| (ml) | 600 | 600 | 600 | 1000 | 3000 | 3000 | 3000 |
| Solvent | | #3 Solvent | | | | ANHYDROL PM-4048 | |
| (ml) | 600 | 150 | 0 | 0 | 3000 | 3000 | 3000 |
| Acidified H₂O (0.1 M HCl)²(ml) | 600 | 600 | 600 | 200 | 3000 | 3000 | 3000 |
| Premixing | | | TEOS + H₂O 30 min. | | | | |
| (°C.) | 23 | 21 | 23 | 22 | RT | RT | RT |
| Time to Gellation | 8 hr | 4 hr | 5.5 hr | 8.3 hr | — | — | — |
| Temperature, °C. | 49–56 | 53 | 45 | 47 | — | — | — |
| Drying | | 24 hr @ 110° C. | | | | 24 hr @ 73° C. 24 hr @ 110° C. | |
| Dry wt (g) | 181.0 | 179.7 | 179.0 | 343.71 | | | |
| Milling | | | 3 hr | | | | 48 hr |
| Screening | | | Screened to −150 mesh | | | | |
| Firing | | | 17° C./hr to 1094° C., hold 5 hr | | | | |
| Chemical Analysis* | | | | | | | |
| Fe, ppm | — | — | — | — | 0.1 | 1.3 | 2.4 |
| Na, ppm | | | | | 0.2 | 0.63 | 0.6 |
| K, ppm | | | | | <0.2 | 0.97 | <0.2 |
| Ca, ppm | | | | | <0.4 | <0.4 | <0.4 |
| Mg, ppm | | | | | <0.1 | 0.33 | 0.16 |
| Al, ppm | | | | | <5 | <5 | <5 |
| B, ppm | | | | | <5 | <5 | <5 |
| | | | | | <11 | <13 | <14 |
| Carbon (C), ppm (Av of 3) | 75 | 34 | 52 | 34 | 43 | 41 | 68 |
| Weight Loss During Calcination (%) | 14.3 | 13.8 | 13.8 | 23.8 | — | 16.9 | 17.6 |
| X-ray Sedigraph (% finer than) | | | | | | | |
| 80 um | 99 | 99 | 100 | 98 | 100 | 100 | 100 |
| 40 um | 86 | 77 | 80 | 77 | 86 | 89 | 89 |
| 20 um | 51 | 39 | 40 | 40 | 68 | 62 | 66 |
| 10 um | 28 | 21 | 21 | 22 | 52 | 42 | 48 |
| 4 um | 10 | 8 | 7 | 8 | 36 | 20 | 25 |
| 2 um | 7 | 3 | 1 | 3 | 16 | 10 | 7 |
| 1 um | — | — | — | — | 5 | 3 | — |
| Alpine Screen Analysis (% finer than) | | | | | | | |
| 150 mesh | 99.99 | 100.00 | 100.00 | 99.95 | | | |
| 200 mesh | 99.78 | 99.57 | 99.60 | 99.39 | | | |
| 325 mesh | 94.38 | 80.76 | 81.69 | 82.37 | | | |

*Elements by atomic absorption, carbon by O.I.
Note:
< means less than.

TABLE V

| | | | | Particle Coarsening | | | | | |
|---|---|---|---|---|---|---|---|---|---|
| Mix: | H | I | J | K | L | M | N | O | P |
| TEOS (ml) DYNASIL-A | 3000 | 3000 | 3000 | 3000 | 3000 | 3000 | 3000 | 1500 | 1500 |

TABLE V-continued

| Mix: | Particle Coarsening | | | | | | | | |
|---|---|---|---|---|---|---|---|---|---|
| | H | I | J | K | L | M | N | O | P |
| #3 Solvent (ml) | 3000 | 3000 | 750 | 3000 | 3000 | 3000 | 3000 | 1500 | 1500 |
| Acidified H$_2$O (ml) (0.1 M HCl) | | | | | | | | | |
| Addition of fumed silica (Degussa's Aerosil A200) in wt % (after 20 hr @ 60° C.) | — | — | — | — | — | — | — | 16 | 10 |
| Premixing | | | TEOS + H$_2$O 30 min. @ RT | | | | | | |
| Mixing | 45 min | 45 min | 50° C. (12 hr) | | | 30 min. | | | |
| Drying, °C. | 73(20 hr) 85(5 hr) 100(18 hr) 125(6 hr) | 110 (24 hr) | 73 (24 hr) 8/hr to 110 110 (83 hr) | 37 (57 hr) 10/hr to 150 150 (3.5 hr) | 50 (17 hr) 10/hr to 150 150 (4 hr) | 62 (24 hr) 10/hr to 150 150 (4 hr) | 150 (6 hr) | | |
| Milling, Hrs. | 24 | 24 | 2.5 | 48 | 16 | | 48 | 1 | 3 |
| Screening | | | | 150 mesh | | | | unscreened | |
| Firing | 17° C./hr to 1093° C., hold 5 hr | RT 149° C.(30 min) 149-649(13 hr) 649° C. (2 hr) 649-1221(10 hr) 1221° C. (1 hr) | | | 17° C./hr to 1093° C., 5 hr hold | | | | |
| Air Flow (SCFH) | 30 | | 30 | — | — | 10 | 10 | 30 | 30 |
| Weight Loss During Calcination, %: | 16.5 | 16.8 | 10.7 | 16.3 | 13.7 | 16.5 | 17.4 | 10.7 | 9.5 |
| X-ray Sedigraph % finer than | | | | | | | | | |
| 80 um | 100 | 100 | 100 | 100 | 97 | 100 | 100 | 99 | 81 |
| 40 um | 98 | 98 | 98 | 90 | 92 | 84 | 87 | 68 | 33 |
| 20 um | 95 | 80 | 70 | 68 | 87 | 55 | 58 | 32 | 14 |
| 10 um | 75 | 53 | 41 | 51 | 71 | 38 | 40 | 17 | 9 |
| 4 um | 37 | 25 | 18 | 29 | 40 | 21 | 22 | 6 | 4 |
| 2 um | 16 | 14 | 7 | 17 | 22 | 13 | 13 | 2 | 1 |
| 1 um | 5 | 4 | 1 | 9 | 9 | 6 | 6 | — | — |
| Chemical Analysis Carbon, ppm | 33 | 372 | 20 | 29 | 72 | — | — | 45 | 33 |

Further work was conducted to produce a silica powder with extremely low levels of carbon. Also, additional work was conducted to increase the particle size of the calcined powder.

Next table VI indicates that evaporation temperatures higher than 45° C. are needed to produce clear gel. Temperatures lower than 45° C. resulted in amber color gel.

TABLE VI

| Mix No.: | Particle Coarsening Study | | | | | |
|---|---|---|---|---|---|---|
| | A | B | C | D | E | F |
| Gelling Conditions | | | | | | |
| Temperature, °C.: | 50 | 37 | 43 | 62 | 73 | 73 |
| Time, hours: | <17 | <57 gel amber color and sticky | 23* | <17 | 20 | 24 |
| Drying | | | | | | |
| Temperature, °C.: | 20/hr to 66, 4 hr hold | 20/hr to 150, 3½ hr hold | 20/hr to 80 | 20/hr to 150, 4 hr hold | 85, 5 hr 100, 18 hrs; 125, 6 hrs | 110 24 hr hold |
| Comments: | clear gel | amber color | (i) | clear gel | clear gel | clear gel |
| Milling: | 48 hrs | 16 hrs | not calcined | — | 48 hrs | 48 hrs |
| Screen Analysis of Milled Gel % held on | | | | | | |
| 20 mesh | 40.6 | — | — | 6 | — | — |
| 48 | 18.4 | | | 1 | | |
| 65 | 5.9 | | | 0.5 | | |
| 100 | 12.1 | | | 13.8 | | |
| 150 | 11.2 | | | 18.8 | | |
| −150 | 11.9 | | | 60.0 | | |
| Calcination: | | | 17° C./hr to 1093° C., 5 hr hold | | | |
| Air Flow During Calcination, SCFH: | 10 | 30 | — | 10 | 30 | 30 |
| Percent Weight Loss: | 16.5 | 13.7 | — | 17.4 | 16.5 | 16.9 |
| X-ray Sedigraph Analysis % finer than | | | | | | |

TABLE VI-continued

| | Particle Coarsening Study | | | | | |
|---|---|---|---|---|---|---|
| Mix No.: | A | B | C | D | E | F |
| 80 microns | 100 | 97 | — | 100 | 100 | 100 |
| 40 | 84 | 92 | | 97 | 90 | 86 |
| 20 | 55 | 87 | | 58 | 94 | 68 |
| 10 | 38 | 71 | | 40 | 75 | 52 |
| 4 | 21 | 40 | | 22 | 37 | 36 |
| 2 | 13 | 22 | | 13 | 16 | 16 |
| 1 | 6 | 9 | | 6 | 5 | 5 |
| Carbon Content, ppm: | — | 72 | — | — | — | 43 |

*In 95% relative humidity.
(i) At 80° C., gel turned amber color.

TABLE VII

| Changes in Calcination Schedules | |
|---|---|
| Mix: | F Mix with less alcohol<br>3 liters Dynasil A<br>0.75 liters No. 3 Solvent<br>3 liters 0.1 M HCl Solution<br>TEOS and alcohol premixed for ½ hour, then acidified water added. Batch continuously mixed at 49° C. for 12 hrs (gelled). Gel dried at 110° C. for 24 hrs. |
| Milling: | 2 ½ hrs |
| Screen Analysis of Milled Gel: | 91.5% - 150 mesh |
| Calcination Schedule: | RT 24° C.–149° C. at 238° C./hr<br>149–649° C. at 21° C./hr<br>649–1221° C. at 39° C./hr<br>1221° C., 1 hr hold |
| Air Flow During Calcination, SCFH: | 30 (powder was hard and chunky* but white) |
| % Weight Loss During Calcination: | 10.7 |
| X-ray Sedigraph Analysis % finer than | |
| 80 microns | 100 |
| 40 | 98 |
| 20 | 70 |
| 10 | 41 |
| 4 | 18 |
| 2 | 7 |
| 1 | 1 |
| Chemical Analysis, ppm | |
| Fe | 1.2 |
| Na | 1.8 |
| K | 1.9 |
| Ca | 0.5 |
| Mg | 1.3 |
| Al | 3.8 |
| B | <5 |
| Ti | <5 |
| C | 20 |

*X-ray diffraction analysis of powder detected 0.2% cristobalite and quartz was not detected.

The above Table VII illustrates that a firing schedule of about 38° C./hr to a peak temperature of 1221° C. with air flow during the calcining step, results in a silica powder with a very low carbon level.

TABLE VIII

| Aerosil 200 Fumed Silica Additions to Sol-Gel Silica | | |
|---|---|---|
| Mix: | Equal volumes of TEOS (Dynasil A), Ethanol (No. 3 Solvent) and 0.1 M HCl Solution | |
| | Sample A | Sample B |
| | 10 wt % Aerosil 200 mixed into gel | 16 wt % Aerosil 200 mixed into gel |
| Drying: | 60° C., 16 hrs, then 150° C. hrs | |
| Milling, hrs: | 3 | 1 |
| Sample: | A | B-1    B-2 |
| Calcination Schedule: | 17° C./hr to 1093° C., 5 hr hold, 30 SCFH Air Flow | RT - 149° C. at 238° C./hr, 149–649° C. at 21° C./hr, 649° C., 2 hr hold, |

TABLE VIII-continued

Aerosil 200 Fumed Silica Additions to Sol-Gel Silica

| | | | 649–1221° C. at 39° C./hr, 1 hr hold at 1221° C. |
|---|---|---|---|
| Percent Weight Loss: | 9.5 | 10.7 | 23.8 |
| X-ray Sedigraph Analysis | | | |
| % Finer than | | | |
| 80 microns | 81 | 99 | 100 |
| 40 | 33 | 68 | 98 |
| 20 | 14 | 32 | 93 |
| 10 | 9 | 17 | 68 |
| 4 | 4 | 6 | 31 |
| 2 | 1 | 2 | 13 |
| 1 | — | — | 4 |
| Carbon content, ppm: | 33 | — | 45 |
| Microtrak Analysis | | | |
| % finer than: | | | |
| 212 microns | — | 100 | — |
| 150 | | 90.6 | |
| 106 | | 80.9 | |
| 75 | | 65.6 | |
| 53 | | 45.0 | |
| 38 | | 31.5 | |
| 27 | | 21.5 | |
| 19 | | 12.9 | |
| 13 | | 9.9 | |
| 9.4 | | 6.5 | |
| 6.6 | | 3.7 | |
| 4.7 | | 2.0 | |
| 3.3 | | 0.1 | |

Addition of sub-micron fumed silica to the sol-gel silica gel was found to dramatically increase the particle size of the calcined powder. Apparently, fumed silica acts as "seeds" which facilitate formation of the silica network during evaporation. The 10 wt% addition of fumed silica was more effective at particle coarsening than the 16 wt% addition.

Figure 1:
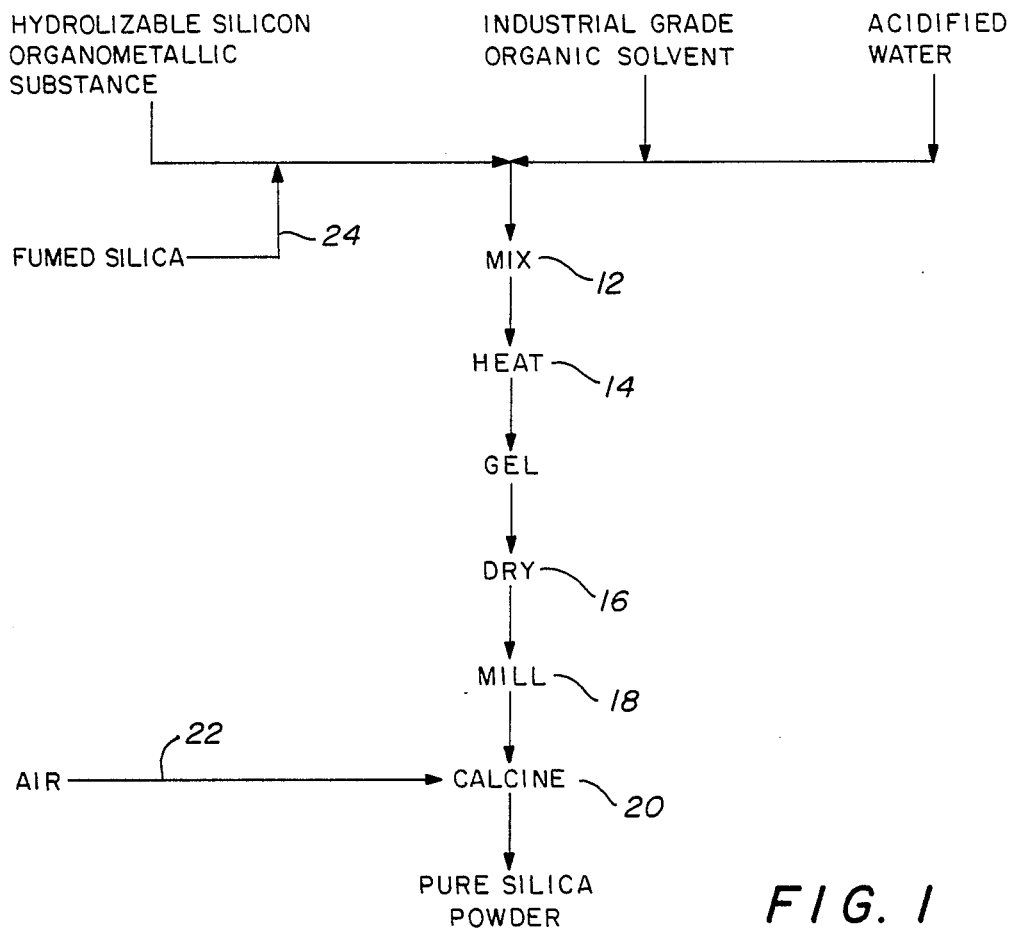
FIG. 1 is a schematic illustration of the process of the invention.

With reference to FIG. 1, the process comprises mixing a hydrolizable silicon organometallic substance, an industrial grade organic solvent and acidified water at station 12 to form a solution, heating the solution at station 14 at a temperature of from about 45° C. to about 75° C. to form a clear gel, further heating the gel at station 16, at a temperature from about 110° C. to about 150° C. to dry the gel, milling the dried gel at station 18, to form a powder, and then calcining the powder to form the pure silica powder. During the mixing step, fumed silica may be added at station 24. The fumed silica increases the particle size of the calcined silica powder. At station 22, air may be directed upward through the milled powder during the calcining step.

While a preferred embodiment of the present invention has been described and illustrated, the invention should not be limited thereto, but may be otherwise embodied within the scope of the following claims.

What is claimed is:

1. A composition for forming a pure silica powder consisting essentially of:
    a quantity of an industrial grade hydrolyzable silicon organometallic substance;
    a quantity of an industrial grade organic solvent miscible in said substance, the ratio by volume of said solvent to said organometallic substance being from about 0.1 to about 1:1;
    a quantity of acidified distilled water having a pH less than 2; and
    micronized fumed silica;
    the quantity of said water being from about 520 to about 720% of the stoichiometric amount and the micronized silica being present in an amount up to 16 wt%.

2. A composition in accordance with claim 1 wherein the organometallic substance is tetraethylorthosilicate.

3. A composition in accordance with claim 2 wherein the organic solvent is ethanol.

4. A composition in accordance with claim 1 wherein the organic solvent is ethanol.

* * * * *

UNITED STATES PATENT AND TRADEMARK OFFICE
CERTIFICATE OF CORRECTION

PATENT NO. : 4,810,415
DATED : March 7, 1989
INVENTOR(S) : Winkelbauer et al.

It is certified that error appears in the above-identified patent and that said Letters Patent is hereby corrected as shown below:

Column 1, line 54, the word "processby" should be --process by--.

Column 5, line 3, "T,0100" should be deleted.

Column 5, paragraph 2 should be cancelled and inserted after Table II.

Columns 9 and 10, after "Acidified H$_2$O (ml) and under headings 'H' through 'P'" respectively there should be inserted -- 3000 3000 3000 3000   3000 3000 3000 1500 1500--.

Signed and Sealed this

Twelfth Day of September, 1989

Attest:

DONALD J. QUIGG

Attesting Officer

Commissioner of Patents and Trademarks